(12) United States Patent
Ide

(10) Patent No.: US 7,916,606 B2
(45) Date of Patent: Mar. 29, 2011

(54) INFORMATION RECORDING MEDIUM, MASTERING DEVICE, IDENTIFICATION INFORMATION RECORDING DEVICE, IDENTIFICATION INFORMATION REPRODUCTION DEVICE, MASTERING METHOD, IDENTIFICATION INFORMATION RECORDING METHOD, AND IDENTIFICATION INFORMATION REPRODUCTION METHOD

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 11/629,678

(22) PCT Filed: Jun. 17, 2005

(86) PCT No.: PCT/JP2005/011144

§ 371 (c)(1), (2), (4) Date: Dec. 15, 2006

(87) PCT Pub. No.: WO2005/124745

PCT Pub. Date: Dec. 29, 2005

(65) Prior Publication Data

US 2008/0043595 A1  Feb. 21, 2008

(30) Foreign Application Priority Data

Jun. 18, 2004  (JP) .................................. 2004-181116

(51) Int. Cl.
*G11B 7/00* (2006.01)

(52) U.S. Cl. ..................................... 369/59.25

(58) Field of Classification Search .................. None
See application file for complete search history.

(56) References Cited

U.S. PATENT DOCUMENTS

| 6,118,752 A * | 9/2000 | Miyagawa et al. ........ 369/275.3 |
| 6,879,637 B1 * | 4/2005 | Nakagawa et al. ........... 375/253 |
| 2003/0152009 A1 | 8/2003 | Usui et al. |
| 2006/0133228 A1 * | 6/2006 | Nagai et al. ................ 369/44.13 |

FOREIGN PATENT DOCUMENTS

| JP | 2002-260286 | 9/2002 |
| JP | 2003-141821 | 5/2003 |
| JP | 2003-178453 | 6/2003 |
| JP | 2003-196836 | 7/2003 |
| JP | 2005-310269 | 11/2005 |
| JP | 2005-310270 | 11/2005 |
| WO | WO0011822 | * 3/2000 |
| WO | 02/101733 | 12/2002 |
| WO | WO 02/101733 A1 | 12/2002 |

* cited by examiner

*Primary Examiner* — Joseph Haley
(74) *Attorney, Agent, or Firm* — Oblon, Spivak, McClelland, Maier & Neustadt, L.L.P.

(57) ABSTRACT

Identification information is recorded by irradiating a laser beam to a predetermined area of an information recording medium by securely changing a land to a pit.
A pair of land and pit is formed in the predetermined area of the information recording medium. A laser beam is irradiated to this pair to record the identification information. Accordingly, by applying a laser beam to this area, a land serving as one of the pair is surely changed to a pit so that the identification information can surely be recorded by irradiating a laser beam to the predetermined area. The remaining pit of the pair remains as a pit even when the laser beam is irradiated. Moreover, the laser beam may not be irradiated to the pit.

12 Claims, 15 Drawing Sheets

FIG. 7

| DATA BIT | MODULATION BIT |
|---|---|
| 00 00 00 00 | 010 100 100 100 |
| 00 00 10 00 | 000 100 100 100 |
| 00 00 00 | 010 100 000 |
| 00 00 01 | 010 100 100 |
| 00 00 10 | 000 100 000 |
| 00 00 | 000 100 100 |
| 00 01 | 000 100 |
| 00 10 | 010 000 |
| 00 11 | 010 100 |
| 01 | 010 |
| 10 | 001 |
| 11(xx1–) | 000 |
| (xx0–) | 101 |
| 11 01 11 | 001 000 000 |
| 00 00 (–fs) | 010 100 |
| 00　　　(–fs) | 000 |

FIG. 8

| SYNC-N | SYNC | SYNC-ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 100 000 |
| FS8 | #01 010 000 000 010 000 000 010 | 101 010 |

FIG. 9

| UID-N | UID BIT | MODULATION BIT |
|---|---|---|
| UID0 | 01 10 01 11 10 | xxx 001 010 101 001 |
| UID1 | 10 10 01 11 10 | xxx 001 010 101 001 |
| UID2 | 01 01 01 11 10 | xxx 010 010 101 001 |
| UID3 | 10 01 01 11 10 | xxx 010 010 101 001 |

FIG. 10

| UID-N | NRZ | NRZI |
|---|---|---|
| UID0,1 | xxx 001 010 101 001 | xxx 00 11 0011 000 1 |
|  |  | xxx 11 00 1100 111 0 |
| UID2,3 | xxx 001 010 101 001 | xxx 0 111 0011 000 1 |
|  |  | xxx 1 000 1100 111 0 |

FIG. 14

| UID-N | UID CODE=0 | UID CODE=1 |
|---|---|---|
| UID0,1 | xxx 00 11 0011 000 1<br>xxx 11 00 1100 111 0 | xxx 00 11 0000 000 1<br>xxx 11 00 0000 111 0 |
| UID2,3 | xxx 0 111 0011 000 1<br>xxx 1 000 1100 111 0 | xxx 0 111 0000 000 1<br>xxx 1 000 0000 111 0 |

FIG. 17

| UID-N | UID CODE=0 | UID CODE=1 |
|---|---|---|
| UID0,1 | 01 10 01 11 10<br>10 10 01 11 10 | xx 10 00 10 10<br>xx 10 11 10 10 |
| UID2,3 | 01 01 01 11 10<br>10 01 01 11 10 | xx 01 00 10 10<br>xx 00 10 10 10 |

INFORMATION RECORDING MEDIUM, MASTERING DEVICE, IDENTIFICATION INFORMATION RECORDING DEVICE, IDENTIFICATION INFORMATION REPRODUCTION DEVICE, MASTERING METHOD, IDENTIFICATION INFORMATION RECORDING METHOD, AND IDENTIFICATION INFORMATION REPRODUCTION METHOD

TECHNICAL FIELD

The present invention relates to an information recording medium recorded with identification information, a mastering apparatus and method for manufacturing the information recording medium, an information recording apparatus and method for recording information in the information recording medium, and an identification information reproduction apparatus and method for reproducing the identification information from the information recording medium.

BACKGROUND ART

First, description will be made on the format of a read-only memory (ROM) of a blue ray disc (hereinafter called a BD) used as a large capacity information recording medium using a blue laser.

The ROM format of BD is hierarchical and the uppermost layer is divided into a physical cluster part and a linking part. Of these, the physical cluster part is constituted of 16 address units, and each address unit is constituted of 31 data frames.

The data frame is constituted of user data record areas each called an ECC cluster and address data or user control data record areas each called a BIS cluster. Of BIS clusters, the address data record area is contained in the first three data frames of each address unit, and the BIS clusters in the remaining data frames are used as the user control data areas.

Each data frame is constituted of one data block 221 of top twenty bits and blocks obtained by dividing remaining data in the unit of 45 bits, 28 blocks in total. A DC control bit is added to the end of each block. This bit is controlled so that an absolute value of DSV corresponding to an occurrence rate of bits after modulation becomes near 0.

A bit train obtained in the manner described above is modulated by using a 1-7 modulation table and converted into a 1-7 pp modulation bit train, after the frame sync signal is prepared in accordance with a frame number or the like. The bit train modulated by using the 1-7 modulation table is a bit train of NRZI which inverts positive/negative pulses by 0 or 1. Therefore, actually recorded in a medium is a signal obtained by converting the NRZI signal through NZRI-NRZ conversion in such a manner that 0 and 1 are in one-to-one correspondence with the pit or land.

Recorded in the linking part are a top frame sync signal not contained in the physical cluster part and data of two frames having the frame structure similar to that of the physical cluster part.

It becomes necessary for optical discs of this type to additionally record identification information different for each of mass production reproduction only media, for example, to manage copyright and the like.

A method of realizing this is known. For example, a reflection film for reflecting read light is melted by irradiating a high output optical beam to a land area on a track of an information recording medium, to thereby lower a reflectivity and form a pseudo pit.

For example, International Patent Publication No. WO03/038822 proposes a method of changing some bits in a predetermined block by a high output beam and fixing the remaining bits, respectively in an information recording medium recorded with data modulated in a block unit.

However, according to the conventional techniques, when a pseudo pit is recorded in some record area, the record area is required to have always a land. Therefore, it is necessary to properly form a record area having a land when an information recording medium is manufactured, resulting in a complicated manufacture process.

The present invention has been made in consideration of the above issues, and an object of the present invention is to provide an information recording medium capable of being manufactured easily in the form of securely forming a land in an identification information record area and reliably recording identification information, a mastering apparatus for manufacturing the information recording medium, an identification information recording apparatus, an identification information reproduction apparatus and methods therefor.

DISCLOSURE OF THE INVENTION

In order to achieve the above-described object, an information recording medium of the present invention includes: a record area in which a bit train generated by a predetermined modulation scheme is recorded; and an identification information area formed in the record area, predetermined identification information including a pair of land and pit being recorded in the identification information area, as presence/absence of the pit formed by laser radiation to the land of the pair.

Further, a mastering apparatus of the present invention includes: a drive unit for rotating a master disc for forming a pattern of lands and pits on a stamper when the stamper is formed for transferring a bit train represented by the pattern of lands and pits on an information recording medium; a bit train generator unit for generating a bit train to be recorded on the master disc; and a record unit for recording the bit train generated by the bit train generator unit on the master disc driven by the drive unit, wherein the bit train generator unit generates a pair of land and pit to be recorded as predetermined identification information in a predetermined area of the information recording medium by a predetermined modulation scheme, the predetermined identification information being recorded as presence/absence of a pit formed by laser radiation to the land of the pair after manufacturing the information recording medium.

Further, a mastering method of the present invention for forming a stamper for transferring a bit train constituted of lands and pits to an information recording medium, rotates a master disc for forming a pattern of lands and pits on the stamper; generates a bit train to be recorded in the master disk; and records the generated bit train in the master disc being rotated, wherein when the bit train is recorded, a pair of land and pit to be recorded as predetermined identification information in a predetermined area of the information recording medium is generated by a predetermined modulation scheme, the predetermined identification information being recorded as presence/absence of a pit formed by laser radiation to the land of the pair after manufacturing the information recording medium.

Further, an information recording apparatus of the present invention for recording identification information in an information recording medium by changing a bit train formed by a predetermined modulation scheme, includes: an area detection unit for detecting from the information recording medium a predetermined area where a pair of land and pit is recorded; and a record control unit for additionally recording the identification information in the predetermined area, by changing the land of the pair to a pit by irradiating a laser beam switched in accordance with bit values of the identification information.

Further, an information recording method of the present invention for recording identification information in an information recording medium by changing a bit train formed by a predetermined modulation scheme, detects from the information recording medium a predetermined area where a pair of land and pit is recorded; and additionally records the identification information in the predetermined area, by changing the land of the pair to a pit by irradiating a laser beam switched in accordance with bit values of the identification information.

Further, an information reproduction apparatus of the present invention for reproducing identification information of an information recording medium recorded by changing a bit train formed in the information recording medium, includes: an area detection unit for detecting from the information recording medium a predetermined area where a pair of land and pit is recorded; and an identification information detection unit for detecting bit values of the identification information from a bit train reproduced from the predetermined area.

Further, an information reproduction method of the present invention for reproducing identification information of an information recording medium recorded by changing a bit train formed in the information recording medium, detects from the information recording medium a predetermined area where a pair of land and pit is recorded; and detects bit values of the identification information from a bit train reproduced from the predetermined area.

BRIEF DESCRIPTION OF DRAWINGS

FIG. 7 is an illustrative diagram showing a 1-7 modulation table.

FIG. 8 is an illustrative diagram showing a frame sync pattern at the start of a data frame.

FIG. 9 is an illustrative diagram showing an NRZI pattern in an area where identification information on the information recording medium is recorded, applied to the present invention.

FIG. 10 is an illustrative diagram showing an NRZ pattern in an area where identification information on the information recording medium is recorded, applied to the present invention.

FIG. 14 is an illustrative diagram showing a correspondence table between identification information and bit trains in the area where identification information is recorded.

FIG. 17 is an illustrative diagram showing a correspondence table between identification information and demodulated bit trains in the area where the identification information is recorded.

BEST MODE FOR CARRYING OUT THE INVENTION

Figure 1:
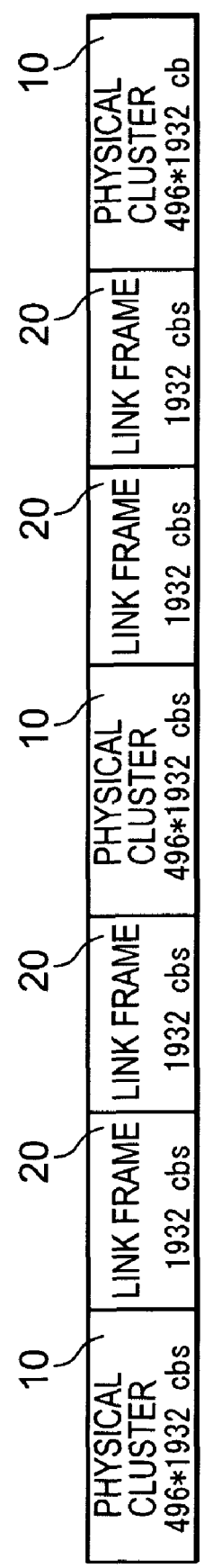
FIG. 1 is an illustrative diagram showing a signal format of an information recording medium applied to the present invention.

According to the embodiment of the present invention, a bit train generated, for example, by a 1-7 modulation scheme is recorded in the information recording medium. The identification information is recorded as presence/absence of a pit in a pair of land and pit formed by laser radiation to the land of the pair and recorded in a predetermined area in, for example, a block (DC control block) not recording a frame sync.

The pair of land and pit is generated by subjecting a predetermined bit train to the 1-7 modulation or the like.

Further, the predetermined bit train includes the following trains.

First, the predetermined bit train may be a bit train converted by the 1-7 modulation or the like into a bit train including at least two lands and two pits.

Further, the predetermined bit train may be a bit train having a shortest run length or a shortest run length +1 of the 1-7 modulation scheme, as a run length of four bits of land and pit obtained by executing the 1-7 modulation or the like. Further, the predetermined bit train may be a bit train having a shortest run length of the 1-7 modulation scheme as a run length of inner two bits of land and pit in the four bits of land and pit. In this case, the predetermined bit train may be a bit train having as a length of said four bits of land and pit, one of (2, 2, 2, 2), (2, 2, 2, 3), (3, 2, 2, 2) and (3, 2, 2, 3) using a channel bit as a unit.

The predetermined bit train may be a bit train in which positions of inner two bits of land and pit in the four bits of land and pit are always at same positions.

Further, the predetermined bit train may be a bit train capable of generating the pair of land and pit, irrespective of preceding and succeeding bit trains. The predetermined bit train may be a bit train having the first two bits of "01" or "10" or the last two bits of "01" or "10" when the predetermined bit train is partitioned by two bits. In this case, the predetermined bit train is a bit train not having the last four bits of "1101".

The predetermined bit train may be a bit train of 10 bits which contains one of (0110011110), (101001110), (0101011110), (1001011110), (0101110101) and (1001110101).

Further, according to the embodiment, in the mastering apparatus and method for forming a stamper for transferring a bit train represented by the pattern of lands and pits on an information recording medium, a pair of land and pit is recorded by the 1-7 modulation or the like in the predetermined area of the DC block of an information recording medium.

Further, according to the embodiment, in the information recording apparatus and method for recording identification information in an information recording medium by changing a bit train formed by the 1-7 modulation or the like, a predetermined area where a pair of land and pit is recorded is detected from the information recording medium, and the identification information is additionally recorded in the predetermined area, by changing the land of the pair to a pit by irradiating a laser beam switched in accordance with bit values of the identification information.

Further, according to the embodiment, in the information reproduction apparatus and method for reproducing identification information of an information recording medium recorded by changing a bit train formed by the 1-7 modulation or the like, a predetermined area where a pair of land and pit is recorded is detected from the information recording medium, and bit values of the identification information are detected from a bit train reproduced from the predetermined area.

First Embodiment

FIG. 1 is an illustrative diagram showing a portion of the format of an information recording medium according to the embodiment of the present invention, and showing the structure of physical cluster parts and linking parts.

As shown in the diagram, the format of an information recording medium used by the embodiment is assumed that a highest hierarchical level is divided into physical cluster parts 10 and linking parts 20 and predetermined one or more physical cluster parts 10 are used as dedicated clusters for recording identification information.

Figure 2:
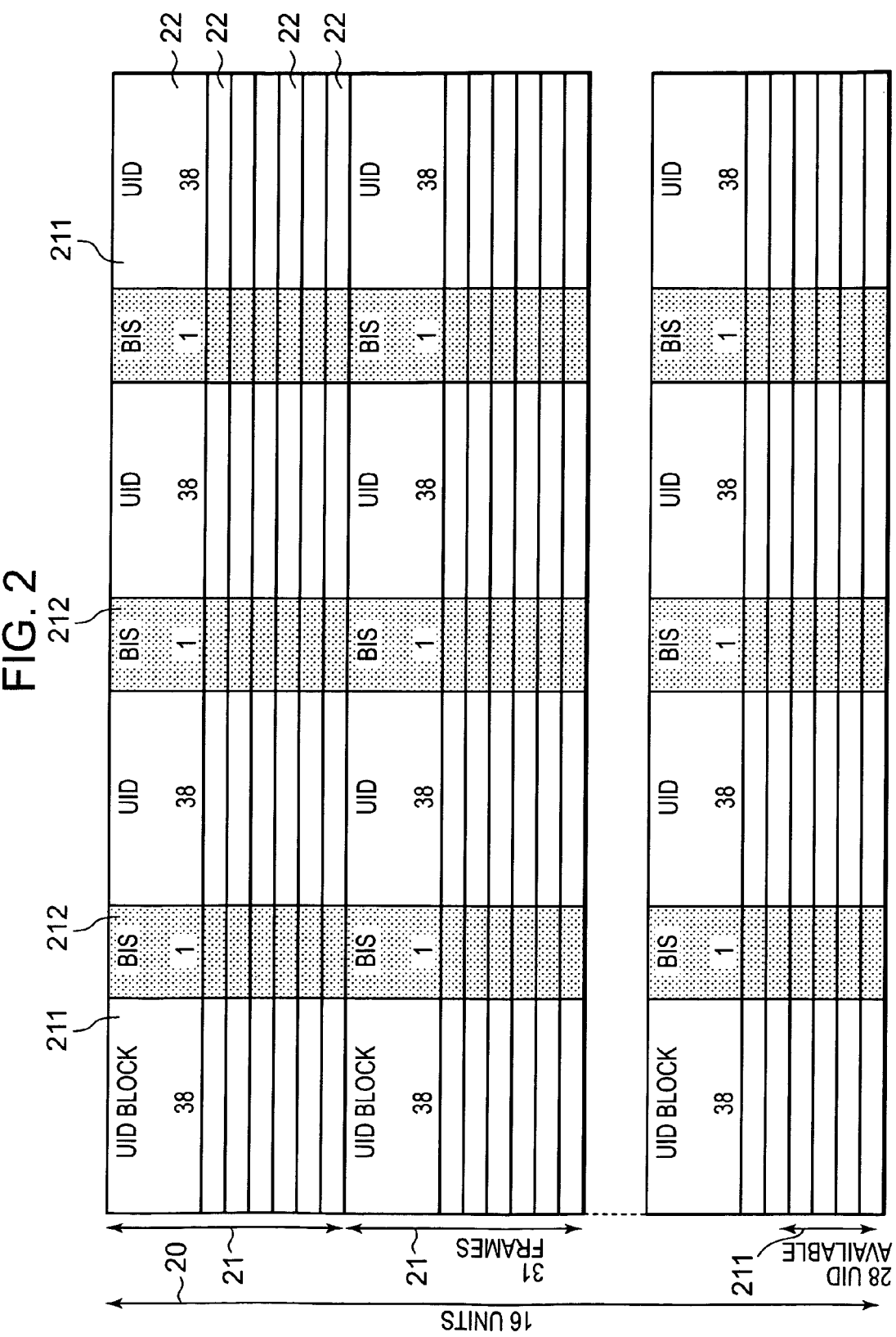
FIG. 2 is an illustrative diagram showing the structure of a physical cluster area of the information recording medium applied to the present invention.

FIG. 2 is an illustrative diagram showing how a data frame is divided into blocks.

Figure 3:
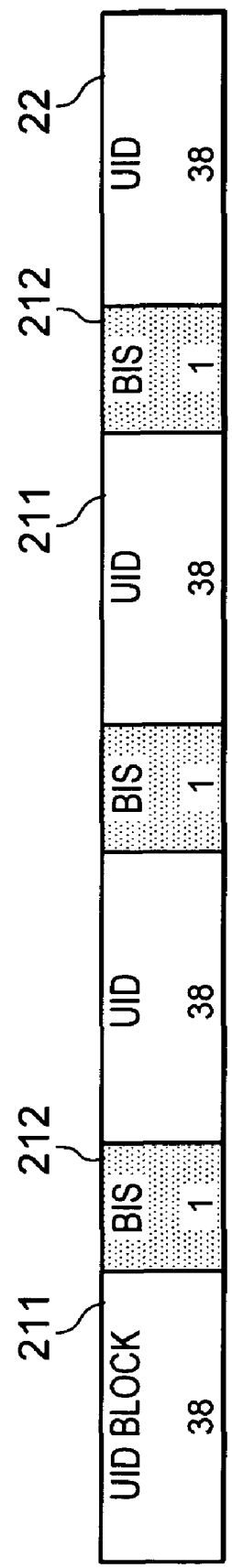
FIG. 3 is an illustrative diagram showing the structure of a data frame of the information recording medium applied to the present invention.

As shown in the diagram, each physical cluster part 10 is constituted of 16 address units. Each address unit 21 is constituted of 31 data frames 22. FIG. 3 is an illustrative diagram showing the structure of a data frame. Each data frame 22 is constituted of user data areas 211 called ECC clusters and address data or user control data areas 212 called BIS clusters.

The address data areas of BIS clusters are contained in first three data frames of each address unit, and BIS clusters in the remaining data frame are generally used as the user control data areas. In this embodiment, the area where identification information is recorded does not require user control data, but it is sufficient if it is possible to know an address. In this embodiment, therefore, in each unit of the physical cluster, data frames in 28 rows not containing address data are used as dedicated frames for recording identification information.

Figure 4:
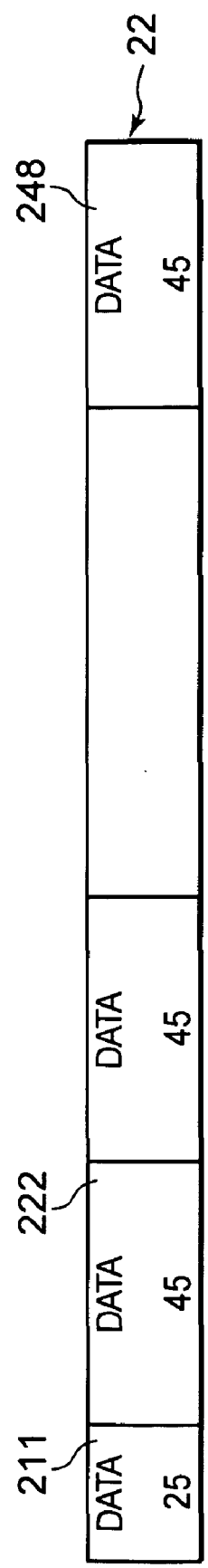
FIG. 4 is an illustrative diagram showing a data block of the information recording medium applied to the present invention.

FIG. 4 is an illustrative diagram showing how the data frame is divided.

As shown in the diagram, one data frame 22 is constituted of one data block 221 of top twenty bits and blocks 222, 223, . . . , 248 obtained by dividing remaining data in the unit of 45 bits, 28 blocks in total.

Figure 5:
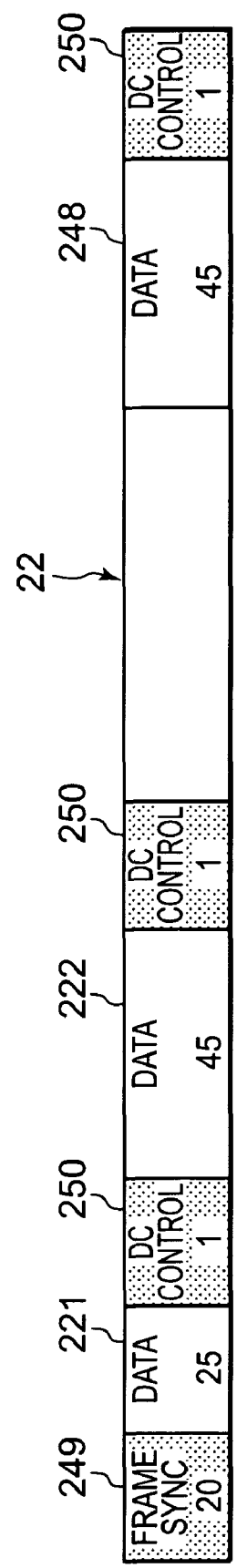
FIG. 5 is an illustrative diagram showing a method of storing parities of the information recording medium applied to the present invention.

FIG. 5 is an illustrative diagram showing divided blocks added with a frame sync signal and DC control bits. As shown in the diagram, a frame sync signal 249 is added to the start of the data frame, and a DC control bit 250 of one bit is added to the end of each block. A bit value in this bit 250 is controlled so that an absolute value of DSV corresponding to an occurrence rate of bits after modulation becomes near 0. Information cannot be recorded in the area of the frame sync signal 249.

In this embodiment, a bit train for recording identification information is set to 10 bits (before modulation), and the bit train of this length can be stored in each DC control block. In this embodiment, therefore, it is assumed that the start area of each block excepting the block for recording the frame sync signal is used as an area for recording identification information of 10 bits.

Figure 6:
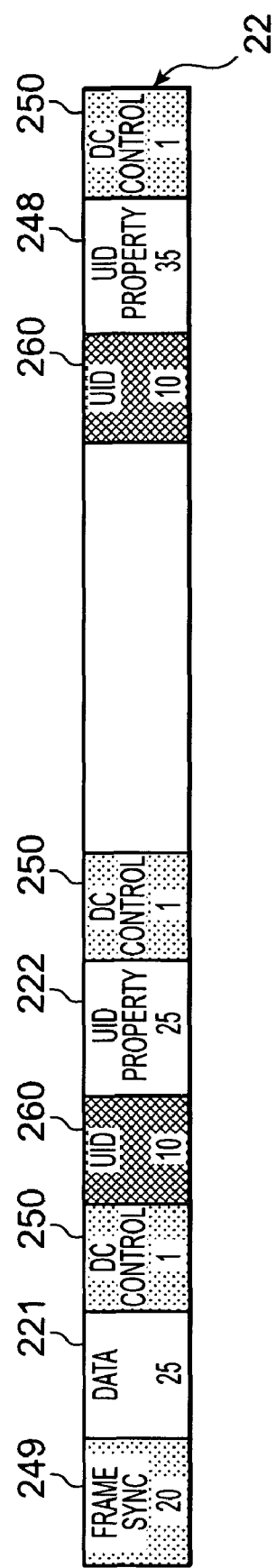
FIG. 6 is an illustrative diagram showing a record area of identification information of the information recording medium applied to the present invention.

FIG. 6 is an illustrative diagram showing the frame structure in which an area for recording identification information (UID) 260 is provided at the start of each block. In this manner, the area for recording identification information is prepared in this embodiment.

A bit train obtained in the manner described above is modulated by using a 1-7 modulation table and converted into a 1-7 pp modulation bit train, after the frame sync signal is prepared in accordance with a frame number or the like. FIG. 7 shows a 1-7 modulation table. It is assumed that xx in FIG. 7 means that x takes a value 0 or 1 as desired. It is also assumed that fs represents a frame sync. FIG. 8 shows frame sync signals. In FIG. 8, # takes a value 1 only when the bit train before modulation and before frame sync is 00 or 0000, and takes a value 0 in other cases.

FIG. 9 is an illustrative diagram showing bit trains to be disposed in the area for recording identification information in this embodiment. In FIG. 9, four types of bit trains are prepared and represented by UID0, UID1, UID2 and UID3. It can be seen that first three bits are converted into xxx independently from preceding and succeeding patterns, and following 12 bits are converted into bit trains containing 3T-2T-2T-3T and 2T-2T-2T-3T.

Bit trains capable of recording identification information are prepared in the manner described above. In these bit trains, the position of inner 2T-2T is always at the eighth bit from the start. It is therefore understood that the area from the eighth bit to eleventh bit from the start of each block is the area for recording identification information. In this example, four bit trains capable of recording identification information are prepared. Any one of these bit trains may be randomly selected and recorded in the area in order to improve security. If security is not necessary, only one of these bit trains may be used. If the position where identification information is recorded is made variable, more bit trains may be introduced.

Record bit trains expressed by NRZ generated in the manner described above, are once converted into bit trains expressed by an NRZ scheme through conversion by NRZ-NRZI. Lastly, the bit train is recorded in an information recording medium by a formatter in such a manner that 0 in the converted bit train corresponds to a pit and 1 corresponds to a land. FIG. 10 is a diagram showing identification information recording bit trains written in NRZI and converted from the identification information recording bit trains written in NRZ. In FIG. 10, xxx in the table of modulation bit trains (NRZ) is dependent upon a bit pattern before modulation, and forms a desired predetermined bit train of 0 or 1 independently from the area for recording identification information in this embodiment. Also, xxx in the table of right bit trains (NRZI) forms a bit train determined by xxx of NRZ. As shown in the drawing, it can be seen that a pair of land and pit of 2T-2T appears at a predetermined position of each bit train.

A pair of land and pit of 2T-2T can be formed at the eighth bit to eleventh bit of each block not having a frame sync, in the manner described above.

Next, description will be made on a manufacture method for the information recording medium.

Figure 11:
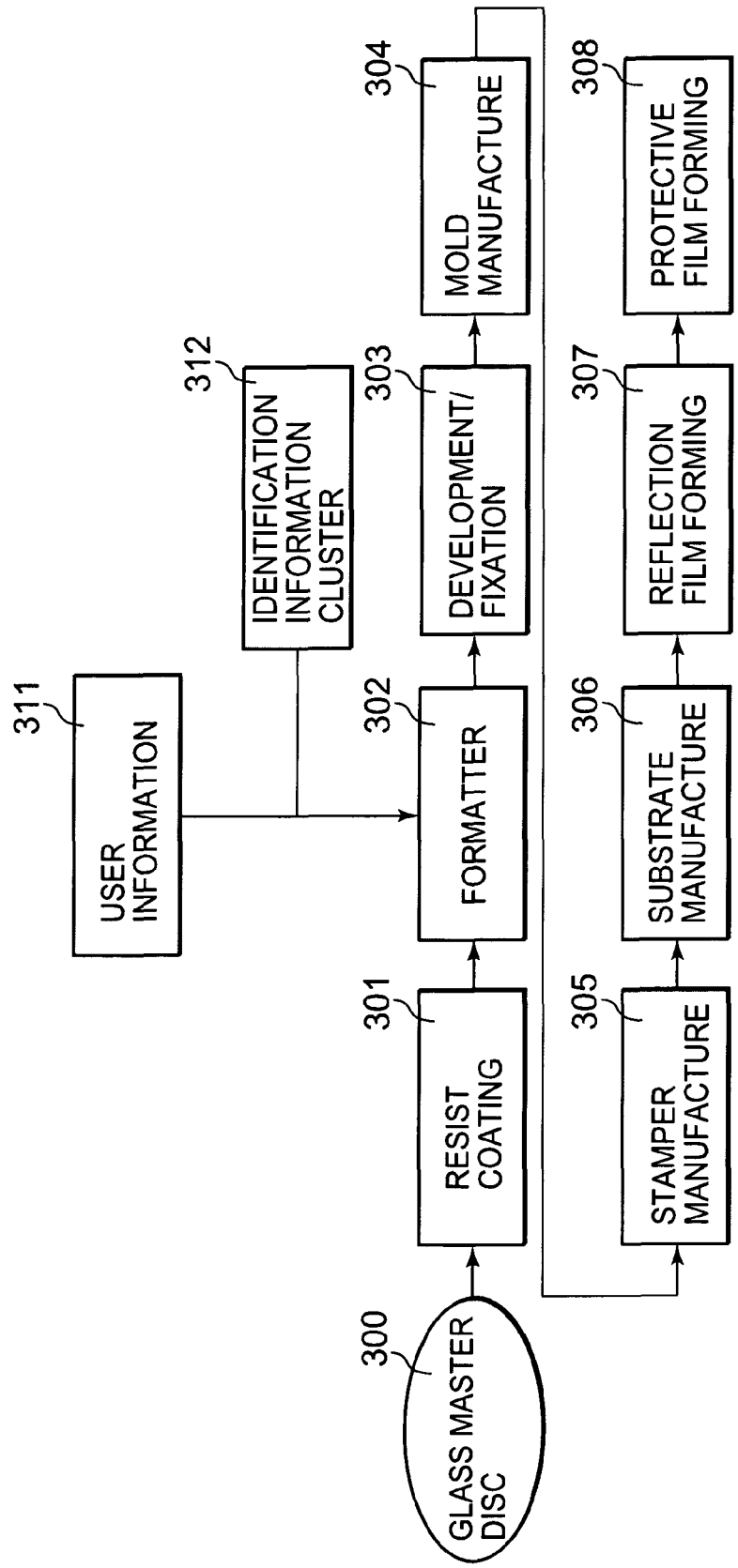
FIG. 11 is an illustrative diagram showing a manufacture method for the information recording medium applied to the present invention.

FIG. 11 is a block diagram illustrating manufacture processes for the information recording medium of the embodiment.

As shown in the drawing, the manufacture method for the information recording medium of the embodiment manufactures a metal master disc by subjecting a glass master disc 300 to a resist coating process 301, a cutting (formatter) process 302, a development/fixation process 303 and a metal master disc (mold) manufacture process 304.

The resist coating process 301 coats photoresist on the glass master disc 300, and the cutting process 302 irradiates a laser beam to the photoresist to record concave/convex patterns, the laser beam being switched in accordance with a bit train. This bit train includes information (user information) 311 desired by a user to record and an identification information cluster 312. The development/fixation process develops the resist recording the concave/convex patterns on the master disc, and fixes the patterns on the master disk, and the metal master disk manufacture process 304 electroplates the surface of the master disc to manufacture the metal master disc (mold).

Next, the manufactured metal master disc is subjected to a stamper manufacture process 305 and a substrate manufacture process 306 to form a disc substrate. The stamper manufacture process 305 manufactures a stamper by using the metal master disc, and the substrate manufacture process 306 places the stamper in a mold and manufactures a disk substrate of transparent resin such as polycarbonate and acrylic by using an injection molding machine. The manufactured disc substrate has the transferred land/bit patterns formed on the master disc by the cutting process.

Next, a reflection film forming process 307 forms a reflection film by sputtering or the like on the surface of the disc substrate where pit patterns are formed. The information recording medium of the embodiment records identification information on the reflection film. In order to realize this embodiment, the reflection film is required to be a film capable of recording not only general bit information but also identification information through thermal recording. Therefore, the reflection film is made of aluminum which is a composition of a general reflection film, or aluminum alloy mixed with a different element. Lastly, a protective film coating process 308 forms a protective film. This process forms the protective film by coating ultraviolet ray curing resin on the reflection film by spin coating and irradiating a ultraviolet ray. Information recorded in the information recording medium manufactured in this manner can be reproduced by irradiating a read laser beam from the protective film side.

A mastering method and a mastering apparatus of the embodiment are related to the cutting process shown in FIG. 11. The laser beam to be irradiated to the photoresist in the cutting process 302 shown in FIG. 11 is switched in accordance with a bit train to be recorded. Sources of switching information are an already modulated bit train to be output from an external storage device generally mounted on a PC or the like.

In the mastering method and apparatus of the embodiment, the external storage device is assumed to be constituted of an external storage device for storing a bit train representative of the general user information 311, another external storage device for storing a bit train for recording the identification information 312, and a switching apparatus for switching between the external storage devices. This switching apparatus is set in such a manner that a laser switching apparatus is connected to the external storage apparatus storing the user information in a normal case and that the laser switching apparatus is connected to the external storage apparatus storing a bit train for recording identification information, in a case of a predetermined physical cluster area for recording identification information. Therefore, the bit train for recording the identification information is recorded in the predetermined physical cluster.

Alternatively, in the mastering method and apparatus, the laser switching apparatus may be connected to an external storage device storing a bit train obtained by replacing a bit train representative of general user information with a bit train for recording identification information in a predetermined physical cluster. In this case, the bit train stored in the external storage device itself contains a main portion for realizing the mastering method and apparatus of the embodiment.

Figure 12:
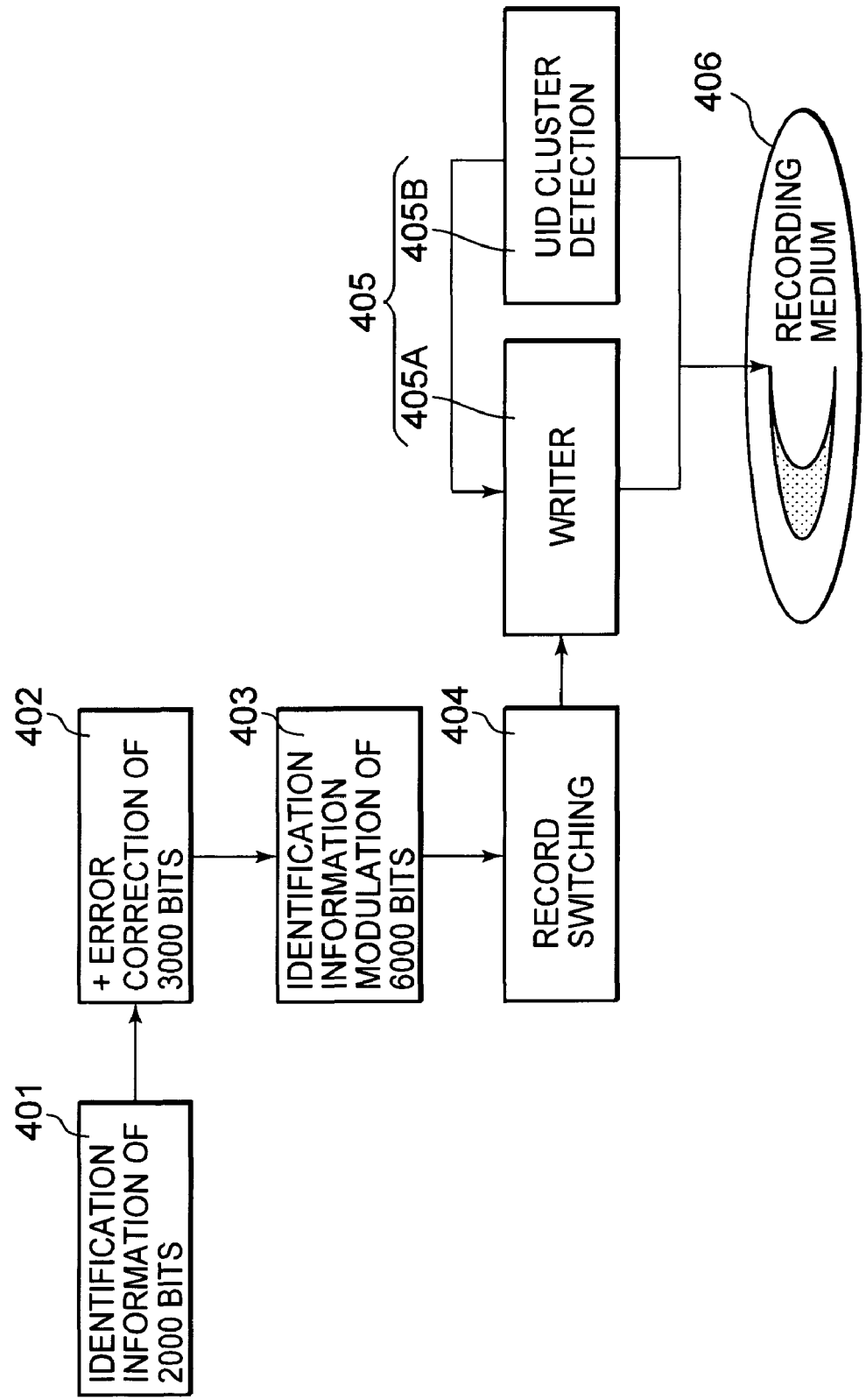
FIG. 12 is a block diagram showing an example of a recording apparatus and method for recording identification information.

FIG. 12 is a block diagram schematically showing an identification information recording apparatus and method of the embodiment.

The identification information recording apparatus and method of the embodiment is constituted of an error correction addition part 402 for receiving an identification information bit train 401 and adding error correction code, a modulation part 403 for modulating the identification information bit train added with the error correction code, a formatter 404 for outputting an identification information pulse signal at a predetermined timing and a writer 405 for actually irradiating a laser pulse to record identification information.

For example, as shown in the drawing, it is assumed that identification information contains 2000 bits. This information is first added with error correction bits by an error correction encoding circuit. An example of the error correction encoding circuit may be a circuit using an algorithm of Reed-Solomon encoding. In this manner, the identification information of, e.g., 3000 bits, is generated having the error correction bits. Next, consider modulation of 3000 bits. For example, it is considered that modulation converts "0" into "01" and "1" into "10". In this case, modulation information has 6000 bits.

The writer 405 for generating a record pulse is constituted of two parts: a part 405B for detecting bit information recorded in a recording medium 406 and a record part 405A for recording identification information in accordance with the detected information.

Figure 13:
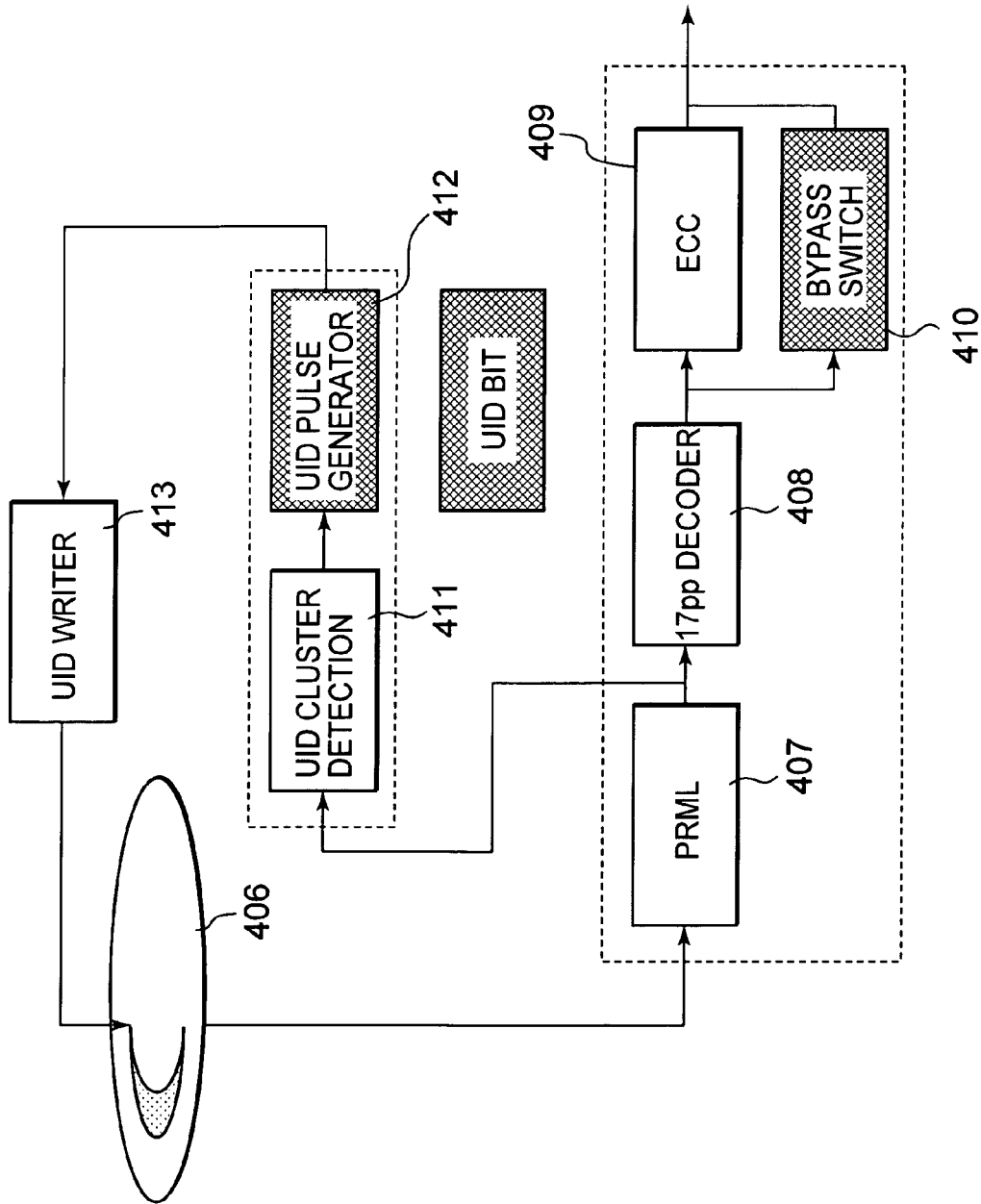
FIG. 13 is a block diagram showing an example of a writer portion of the recording apparatus and method for recording identification information.

FIG. 13 is a block diagram showing the writer of the embodiment.

A part for detecting bit information has the same structure as that of a general reproduction apparatus.

This part is constituted of a clock generator circuit (not shown) for reproducing clocks from a reproduction signal obtained from reflection information from the medium 406 by using an unrepresented read laser beam, a PRML data detector circuit 407 for detecting bit information from the reproduction signal, a decoder 408 for decoding the reproduction signal, an ECC 409 for executing an error correction process for the reproduction signal, a bypass SW 410 for bypassing ECC 409, and the like. These structures may be the same structures as those of a general reproduction apparatus.

The record part for recording identification information is structured by preparing an additional identification information record circuit for the reproduction apparatus. The record part is constituted of a record area detector part 411 for detecting a specific physical cluster area for recording identification information, in accordance with the bit train output from the PRML data detector circuit 407, and a pulse generator part 412 for outputting a pulse signal for controlling laser radiation switching.

In order to detect a specific physical cluster area for recording identification information, for example, a specific bit train is recorded at the start of a physical cluster area. If this specific bit train is recorded also on the recording apparatus side, the recording apparatus searches a pattern-matched bit train from reproduced bit trains so that the position of the bit train can be detected easily.

After the start is detected, the pulse signal is output to switch laser radiation at a predetermined timing. The pulse signal is a signal for switching laser radiation to the predetermined radiation area in accordance with bit values of identification information. Of this pulse signal, a first signal is generated at the first frame not containing address information. Thereafter, a signal is generated which switches in accordance with the bit values of identification information, so that laser radiation is effected for the 8-th to 11-th bits counted from the start of an even number block in the cluster. Namely, a record laser switching signal of a four-bit length in correspondence with bit values of identification information is generated for each of the 77-th to 138-th bits in the frames not containing address information.

FIG. 14 illustrates the case in which identification information is recorded in the bit train generated as shown in FIG. 10.

If the bit value (UIDcode) of identification information is 0, a record laser beam is not irradiated so that the bit value is maintained as shown in FIG. 10. If the bit value of identification information is 1, a record beam is irradiated so that a 2T land ("0110") is extinguished and becomes ("0000"). In this manner, the bit values of identification information can be recorded in accordance with presence/absence of the 2T land.

In this arrangement, a laser beam is irradiated to a pair of land and pit constituted of 8-th to 11-th bits of a block, on the assumption of knowing only that there is a pair of land and pin at the 8th to 11-th bits of the block. If it can know that which of the land and pit appears first, it is possible to irradiate a laser beam only to the land of the pair. In order to realize this, for example, the positions of land and bit in the area are confirmed from the reproduced bit train. It may also be considered that an inversion control bit is prepared before the laser radiation area to maintain always the same order of land and bit in the radiation area.

Next, description will be made on a method of reproducing identification information from a medium recording the identification information.

Figure 15:
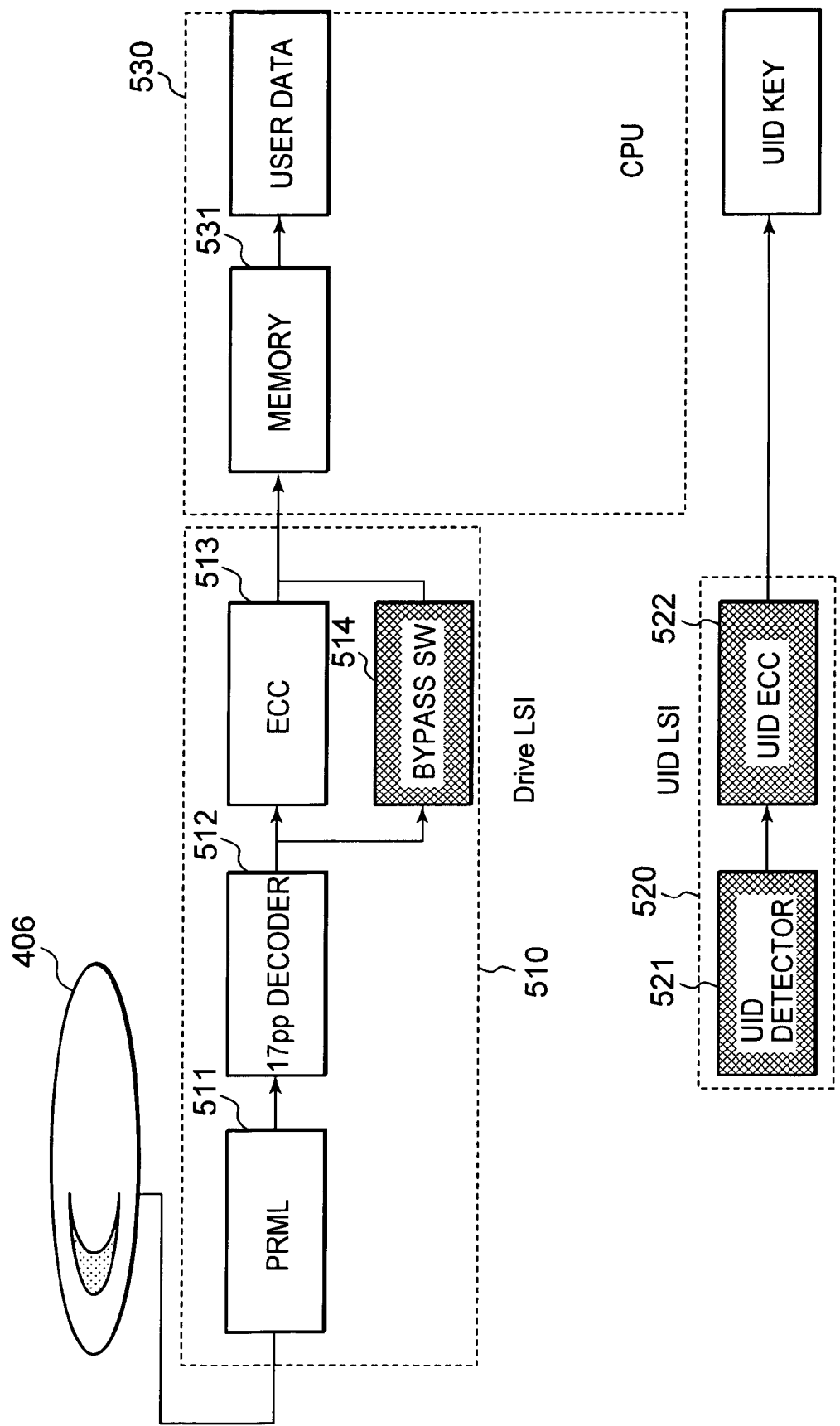
FIG. 15 is a block diagram showing an example of a reproduction apparatus and method for reproducing identification information.

FIG. 15 shows an example of a reproduction method and apparatus for reproducing identification information in the embodiment.

This reproduction apparatus is constituted of two parts: a bit detection part (Drive LSI) 510 for detecting bit information recorded in the recording medium 406 and an identification information detection part (UID LSI) 520 for detecting identification information from the detected information.

The bit detection part 510 has the same structure as that of a general reproduction apparatus.

Namely, this part is constituted of a clock generator circuit (not shown) for reproducing clocks from a reproduction signal obtained from reflection information from the medium by using an unrepresented read laser beam, a PRML data detector circuit 511 for detecting bit information, a decoder 512 for decoding the reproduction signal, an ECC 513 for executing an error correction process for the reproduction signal, a bypass SW 514 for bypassing ECC 409, and the like. Reproduction data is output to a memory 531 of a CPU 530. These structures may be the same structures as those of a general reproduction apparatus.

The identification information detection part 520 is structured by preparing an additional identification information reproduction circuit for the reproduction apparatus. This part is constituted of a cluster detection part 521 for detecting a specific physical cluster area for recording identification information, in accordance with the bit train output from the PRML data detection circuit 511, and an identification information detection part 522 for detecting identification information recorded in a predetermined area in the detected area.

In order to detect a specific physical cluster area for recording identification information, for example, a specific bit train is recorded at the start of a physical cluster area. If this specific bit train is recorded also on the reproduction apparatus side, the reproduction apparatus searches a pattern-matched bit train at the start of the cluster from reproduced bit trains so that the position of the bit train can be detected easily.

After the start is detected, detected is the state of a pair of land and pit at the start (from the 8-th to 11-th bits from the start) of each block in the frame constituting clusters. If this area contains a pair of land and pit, the bit value of identification information is 0, whereas if this area contains only pits, the bit value of identification information is 1. An actual logic circuit uses a table showing a correspondence between the bit values of identification information (UID) shown in FIG. 14 and bit trains.

Figure 16:
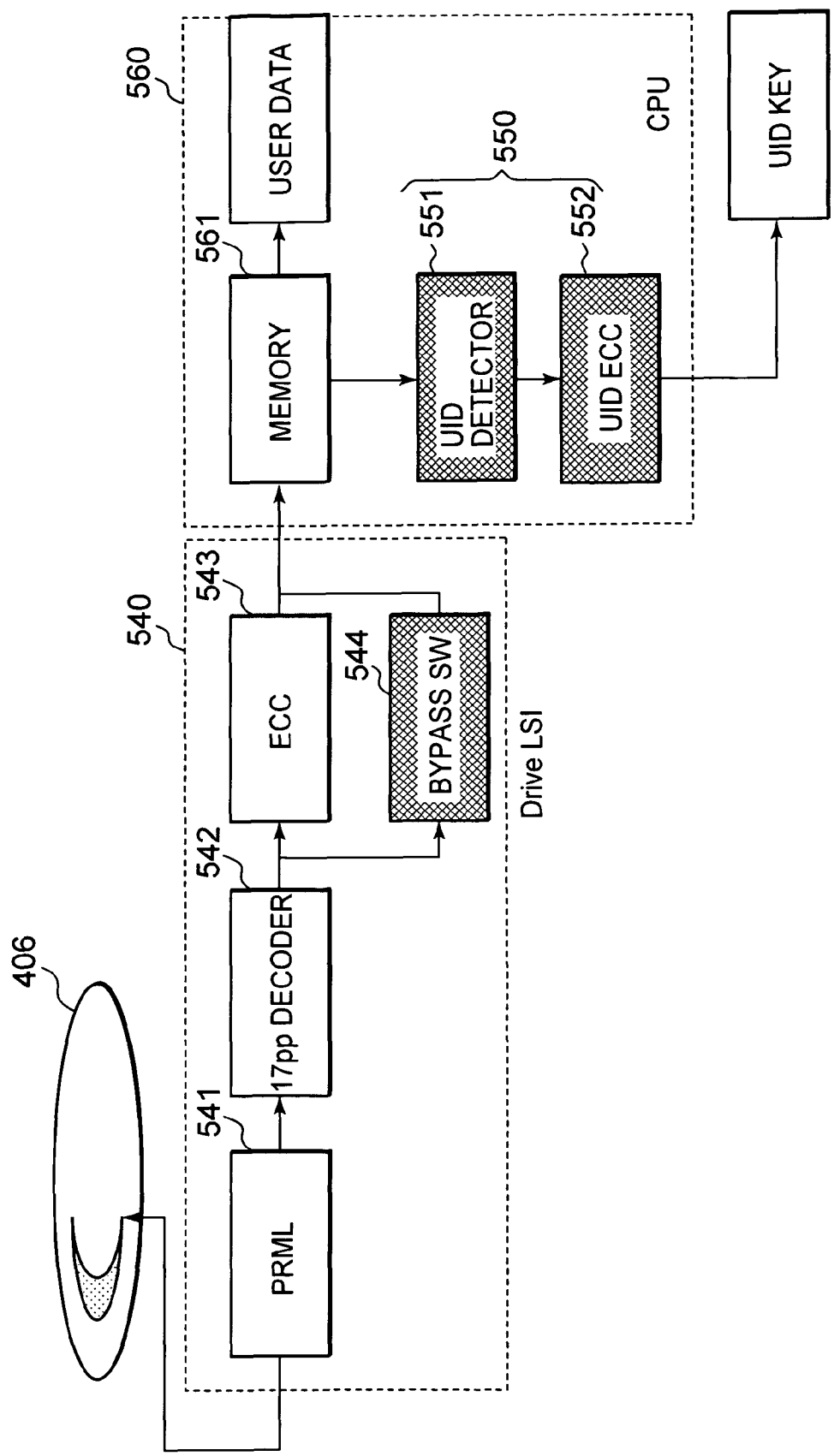
FIG. 16 is a block diagram showing another example of a reproduction apparatus and method for reproducing identification information.

FIG. 16 shows another example of a reproduction method and apparatus for reproducing identification information in the embodiment.

This reproduction method and apparatus is constituted of two parts: a bit detection part 540 for detecting bit information recorded in the recording medium and an identification information detection part 550 for detecting identification information from the detected information. The identification detection part 550 is provided in a CPU 560. The first bit detection part 540 has the same structure as that of a general reproduction apparatus, and similar to the example shown in FIG. 15, includes a PRML data detector circuit 541, a decoder 542, an ECC 543 and a bypass SW 544.

The identification information detection part 550 is realized by software in CPU 560 receiving the detected bit information, and includes a cluster detection part 551 and an identification information detection part 522. Namely, for CPU 560, a bit pattern as the start of the cluster is stored as a bit train not subjected to 1-7 modulation, and a bit pattern corresponding to bit values of identification information is stored as a bit train not subjected to 1-7 modulation. CPU 560 first detects the start of the cluster and then detects a bit train in the area where the identification information is recorded.

FIG. 17 shows a result of decoding a pattern of 1-7 modulation of the identification information shown in FIG. 14. However, in the example having the bit value 1 of identification information, xx means that the bit train is the same as that before the identification information is recorded. The reproduction apparatus compares the pattern of the bit train in the area where the identification information is recorded, with the table, to select a pattern of the bit train near that in the table. The bit values of identification information corresponding to the selected bit train are used as the bit values of identification information recorded in the area.

This method can be easily realized in CPU.

As described above, according to the embodiment, in the information recording medium which records identification information by changing some bit in a predetermined block, the record area of the identification information is a pair of land and bit. It is therefore possible for an irradiated record laser beam to change surely the land to the pit and record the identification information. Even if the laser beam is irradiated to the pit, it remains as the pit. The structures of the identification information recording apparatus and reproduction apparatus and their control become simple and identification information can be recorded easily.

INDUSTRIAL APPLICABILITY

According to the information recording apparatus of the present invention, in the information recording medium which records identification information by changing some bit in a predetermined block, the record area of the identification information is a pair of land and bit. It is therefore possible for an irradiated record laser beam to change surely the land to the pit and record the identification information. Even if the laser beam is irradiated to the pit, it remains as the pit. The advantages are therefore presented that the structure for recording the identification information becomes simple and identification information can be recorded easily.

Further, according to the mastering apparatus and method of the present invention, since a pair of land and pit is formed by mastering in a predetermined area of an information recording medium, the advantages are therefore presented that the identification information in the predetermined area of the information recording medium can be recorded by simple structure and control and that the information recording medium for recording identification information can be manufactured easily.

Further, according to the information recording apparatus and method, a predetermined area where a pair of land and pit is recorded is detected from an information recording medium, and a laser beam switched in accordance with the bit values of identification information is irradiated to the predetermined area to change the land to the pit and additionally record the identification information. Accordingly, the advantages are presented that the identification information in the information recording medium can be recorded by simple structure and control.

Further, according to the information reproduction apparatus and method of the present invention, when identification information of an information recording medium is reproduced, a predetermined area where a pair of land and pit is recorded is detected from the information recording medium and bit values of the identification information are detected from a bit train reproduced from the predetermined area. Accordingly, the advantages are presented that the identification information can be reproduced from the information recording medium by simple structure and control.

The invention claimed is:

1. An information recording medium comprising:
   a record area in which a bit train generated by a predetermined modulation scheme is recorded; and
   an identification information area formed in said record area, predetermined identification information including a pair of land and pit being recorded in said identification information area, as presence/absence of the pit formed by laser radiation to the land of said pair,
   wherein said pair of land and pit is a pair of land and pit obtained by subjecting a predetermined bit train to predetermined modulation,
   said predetermined bit train is a bit train having a shortest run length or a shortest run length +1 of said predetermined modulation scheme, as a run length of four bits of land and pit obtained by executing said predetermined modulation, and
   said predetermined bit train is a bit train having a shortest run length of said predetermined modulation scheme as a run length of inner two bits of land and pit in said four bits of land and pit.

2. The information recording medium according to claim 1, wherein said predetermined modulation scheme is a 1-7 modulation scheme.

3. The information recording medium according to claim 1, wherein said record area includes a plurality of data frames including DC control blocks, and a frame sync added to a start of said data frames, and said identification information area is predetermined areas in said DC control blocks.

4. The information recording medium according to claim 1, wherein said predetermined bit train is a bit train converted by said predetermined modulation into a bit train including at least two lands and two pits.

5. The information recording medium according to claim 1, wherein said predetermined bit train is a bit train having as a length of said four bits of land and pit, one of (2, 2, 2, 2), (2, 2, 2, 3), (3, 2, 2, 2) and (3, 2, 2, 3) using a channel bit as a unit.

6. The information recording medium according to claim 1, wherein said predetermined bit train is a bit train in which positions of inner two bits of land and pit in said four bits of land and pit are always at same positions.

7. The information recording medium according to claim 1, wherein said predetermined bit train is a bit train capable of generating said pair of land and pit by said predetermined modulation, irrespective of preceding and succeeding bit trains.

8. The information recording medium according to claim 1, wherein said predetermined bit train is a bit train having the first two bits of "01" or "10" when said predetermined bit train is partitioned by two bits.

9. The information recording medium according to claim 1, wherein said predetermined bit train is a bit train having the last two bits of "01" or "10" when said predetermined bit train is partitioned by two bits.

10. The information recording medium according to claim 1, wherein said predetermined bit train is a bit train not having the last four bits of "1101" when said predetermined bit train is partitioned by two bits.

11. The information recording medium according to claim 1, wherein said predetermined bit train is a bit train of 10 bits.

12. The information recording medium according to claim 1, wherein said predetermined bit train is a bit train containing one of (0110011110), (101001110), (0101011110), (1001011110), (0101110101) and (1001110101).

* * * * *